(12) United States Patent
Lin

(10) Patent No.: US 10,836,449 B2
(45) Date of Patent: Nov. 17, 2020

(54) MOBILE DEVICE MOUNT FOR VEHICLES

(71) Applicant: FRUITSHOP INTERNATIONAL CO., LTD., New Taipei (TW)

(72) Inventor: Chin-Sheng Lin, New Taipei (TW)

(73) Assignee: FRUITSHOP INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 16/411,100

(22) Filed: May 13, 2019

(65) Prior Publication Data

US 2020/0207434 A1   Jul. 2, 2020

(30) Foreign Application Priority Data

Dec. 27, 2018   (TW) .............................. 107217687 U

(51) Int. Cl.
*B62J 11/00*   (2020.01)
*B62J 50/21*   (2020.01)

(52) U.S. Cl.
CPC .............. *B62J 11/00* (2013.01); *B62J 50/225* (2020.02)

(58) Field of Classification Search
CPC ................................. B62J 50/22; B62J 50/225
USPC ........... 224/420, 455, 460; 248/74.3, 229.17, 248/228.8, 230.8
See application file for complete search history.

(56) References Cited

U.S. PATENT DOCUMENTS

| | | | |
|---|---|---|---|
| 5,201,442 A * | 4/1993 | Bakalian ................... | A45F 3/16 222/610 |
| 9,182,069 B2 * | 11/2015 | Haarburger .......... | F16M 11/041 |
| D840,385 S * | 2/2019 | Deng ............................ | D14/250 |

FOREIGN PATENT DOCUMENTS

| | | | | |
|---|---|---|---|---|
| CN | 203407653 U | | 1/2014 | |
| CN | 203840034 U | | 9/2014 | |
| CN | 206634119 U | * | 11/2017 | .............. B62J 11/00 |
| CN | 107738712 A | | 2/2018 | |
| CN | 207173810 U | | 4/2018 | |
| CN | 209096889 U | | 7/2019 | |
| DE | 102017128167 A1 | | 5/2019 | |
| GB | 2555934 A | | 5/2018 | |

(Continued)

OTHER PUBLICATIONS

"Topeak Smartphone Holder w/Powerpack" by Dave Atkinson. Published May 6, 2016.

(Continued)

*Primary Examiner* — Scott T McNurlen
(74) *Attorney, Agent, or Firm* — Chun-Ming Shih; HDLS IPR Services

(57) ABSTRACT

A mobile device mount for vehicles, which is used for fastening on a handle stem of a bicycle, includes a mounting portion, a first holding structure, a second holding structure and a binding structure. The first holding structure is disposed on a surface of the mounting portion to form a holding area. The second holding structure is disposed on the other surface of the mounting portion to form another holding area and has a protruding portion for leaning against the handle stem. The binding structure is connected to the mounting portion and has a binding ring and a binding belt. The binding ring is located at a side of the mounting portion, and the binding belt extends from another side of the mounting portion. Thereby the protruding portion leans against the handle stem, and the binding belt surrounds the handle stem to fasten to the binding ring.

9 Claims, 8 Drawing Sheets

(56) References Cited

FOREIGN PATENT DOCUMENTS

KR  20140005663 A  1/2014
TW  M535430 U  1/2017

OTHER PUBLICATIONS

Search Report dated Nov. 13, 2019 of the corresponding UK patent application No. 1906932.7.
Evaluation report dated Nov. 12, 2019 of the corresponding China patent application No. 201822213698.1.

* cited by examiner

MOBILE DEVICE MOUNT FOR VEHICLES

BACKGROUND OF THE INVENTION

Technical Field

The invention relates to accessories of electronic apparatuses, particularly to mobile device mounts used for bicycles.

Related Art

With rapid development of technological industries, electronic products such as smartphones and tablet computers provide various information services through wireless network anytime and anywhere, especially such as navigation application program which can be used outdoors is installed. Thus, there have been mounts for holding the abovementioned electronic products on a frame or a handle stem of a bike in the market. These mounts allow bike riders to use the navigation application program or other programs or services on an electronic product when riding the bike.

However, currently available mounts are used for only one electronic product but cannot allow an electronic product to associate with another one such as a power bank. It is really inconvenient for bike riders, especially for the power bank which cannot associate with the electronic product held on a mount fastened to the bike. Occasionally, the rider must stop riding to charge his or her electronical product.

SUMMARY OF THE INVENTION

An object of the invention is to provide a mobile device mount for vehicles, which can hold more than one mobile device depending upon requirements of a user, for example, a smartphone and a power bank, the former can be normally used and simultaneously charged by the latter when riding a bike To accomplish the above object, the invention provides a mobile device mount for vehicles, which is used for fastening on a rod of a bicycle, includes a mounting portion, a first holding structure, a second holding structure and a binding structure. The mounting portion has a first surface and a second surface opposite to the first surface. The first holding structure is disposed on the first surface and associates with the first surface to form a first holding area. The second holding structure is disposed on the second surface, associating with the second surface to form a second holding area, and has a protruding portion for leaning against the rod. The binding structure is connected to the mounting portion and has a binding ring and a binding belt. The binding ring is located at a side of the mounting portion. The binding belt extends from another side of the mounting portion. Thereby, the protruding portion leans against the rod and the binding belt surrounds the rod to fasten to the binding ring.

DETAILED DESCRIPTION OF THE INVENTION

Figure 1:
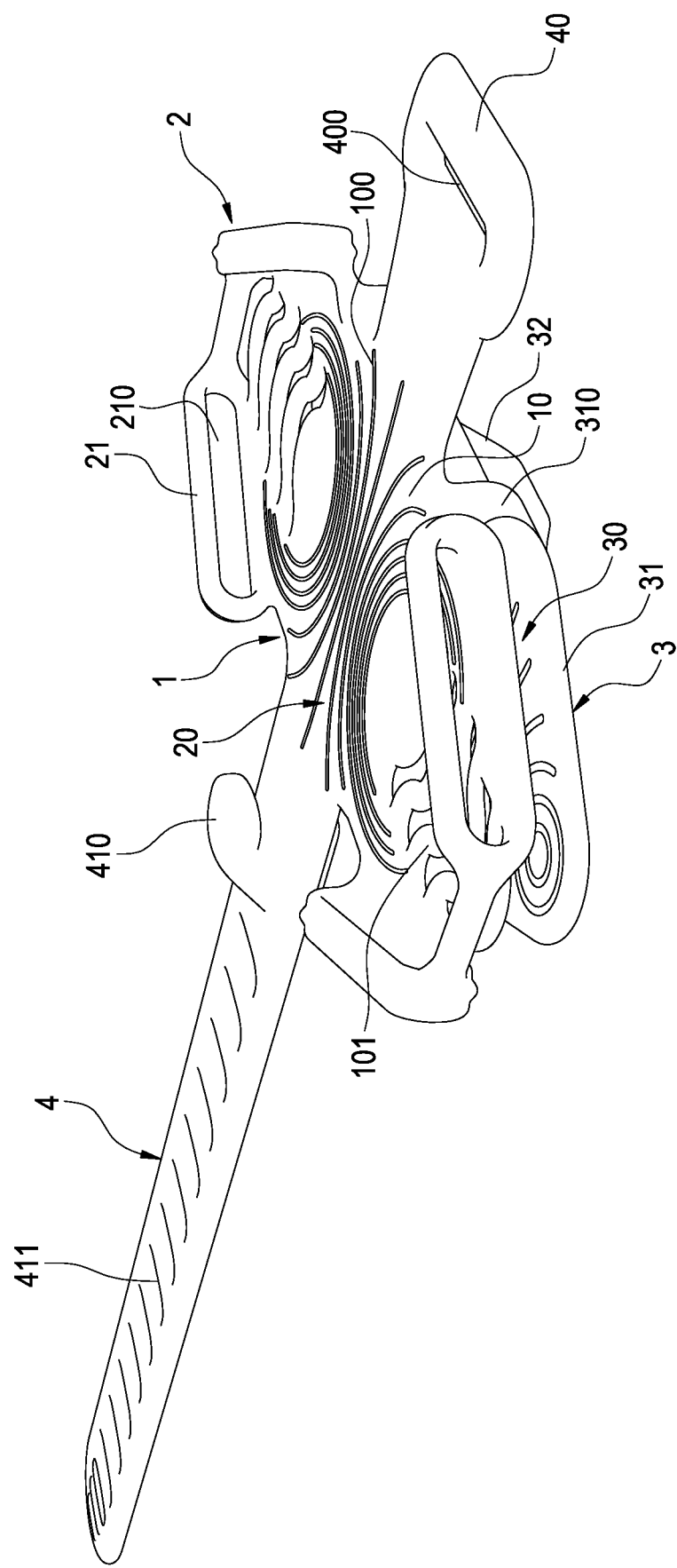
FIG. 1 is a perspective view of the invention.
Figure 2:
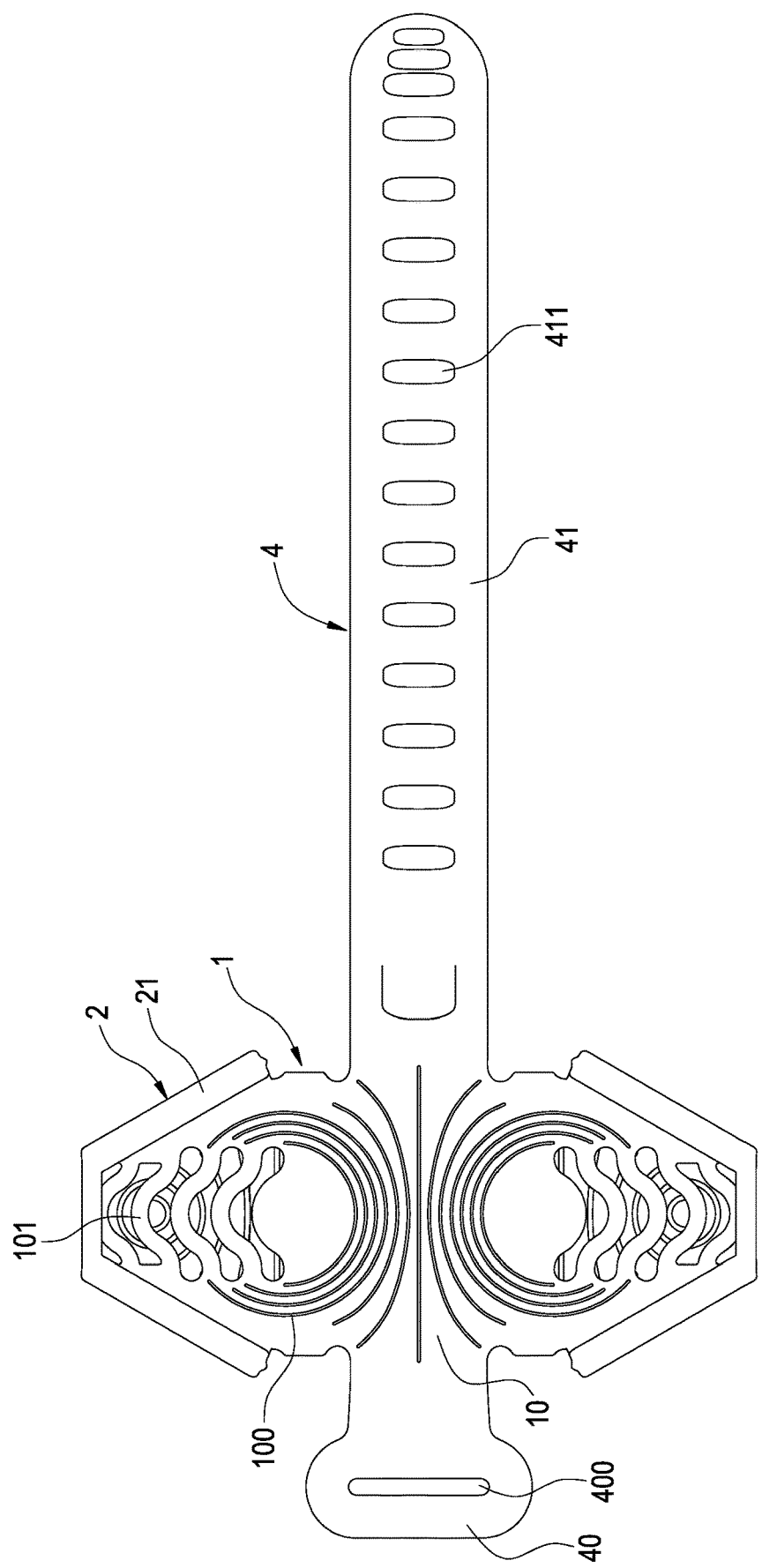
FIG. 2 is a plan view of the invention.
Figure 3:
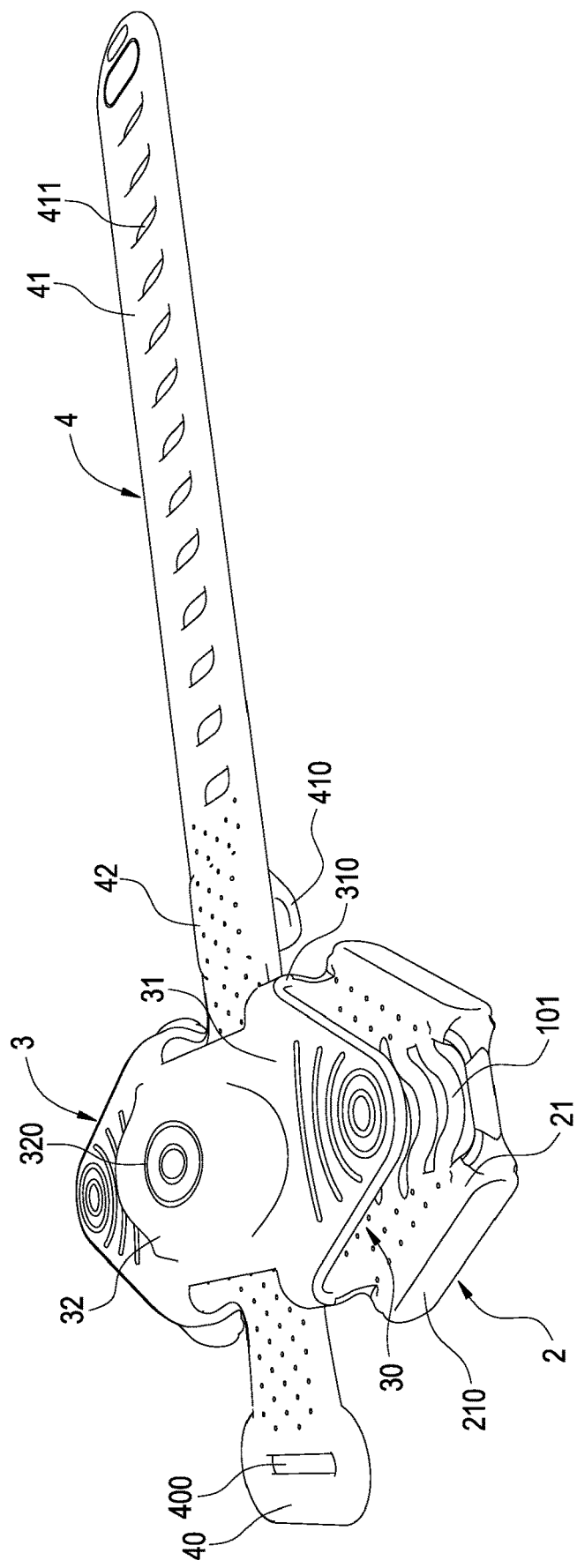
FIG. 3 is another perspective view of the invention.

Please refer to FIGS. 1-3, which are a perspective view, a plan view and another perspective view of the invention, respectively. The invention provides a mobile device mount for vehicles, which is used for holding two mobile devices 5 and 6 on a rod 7 (such as a handle stem) of a bicycle. As a result, a user can simultaneously use two mobile devices 5, 6. The mount includes a mounting portion 1, a first holding structure 2, a second holding structure 3 and a binding structure 4.

Figure 4:
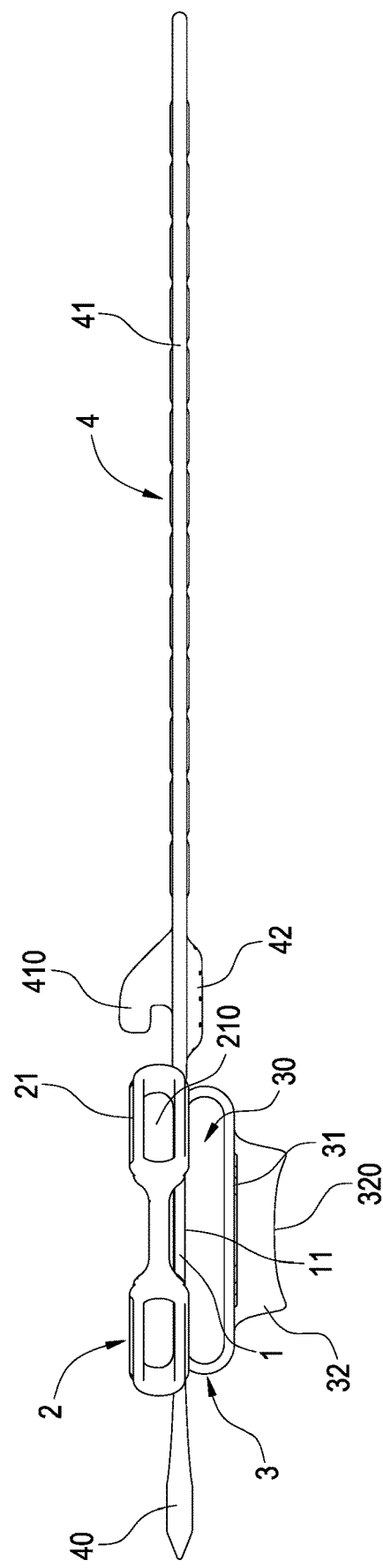
FIG. 4 is side view of the invention.
Figure 6:
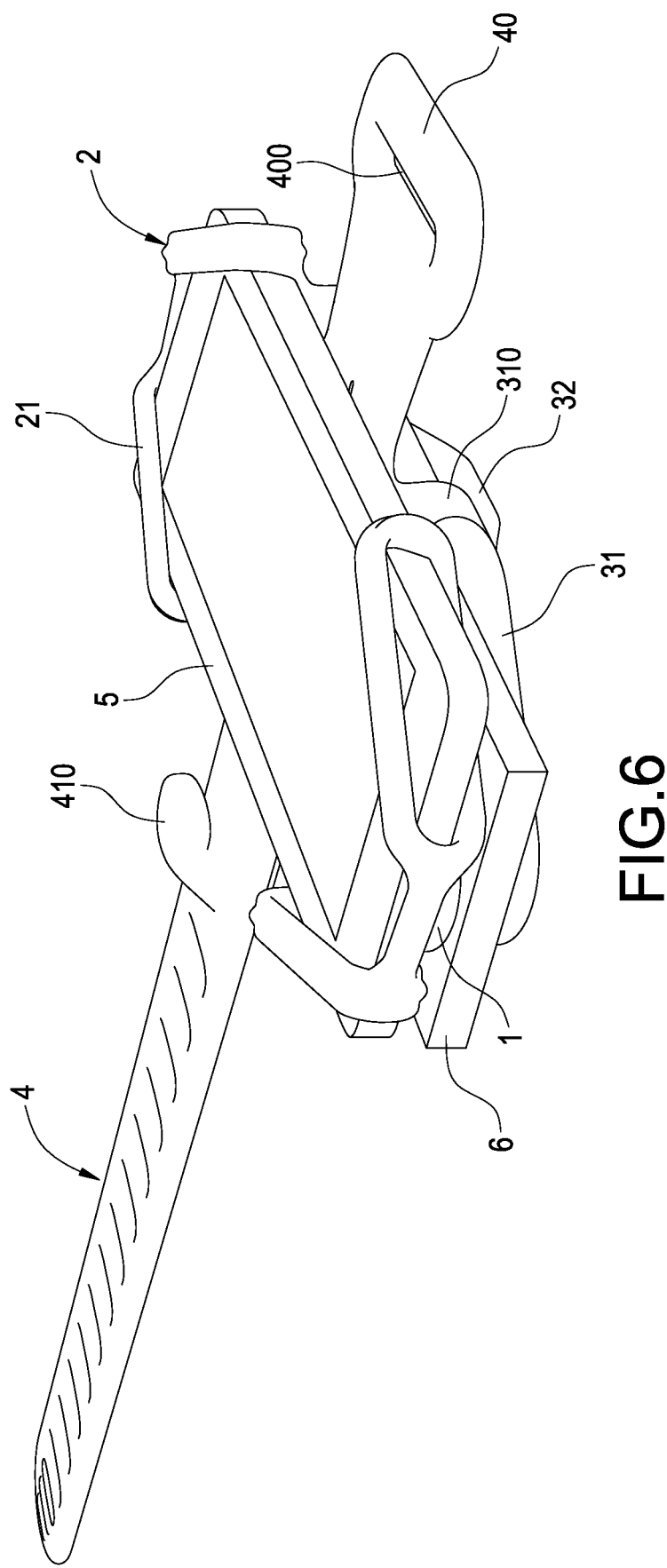
FIG. 6 is a schematic view of the invention loading a mobile device.

The mounting portion 1 is of a sheet or plate shape and has a first surface 10 and a second surface 11 opposite to the first surface 10 as shown in FIG. 4. The invention utilizes the two surfaces 10 and 11 of the mounting portion 1 to separately form two holding area to hold two mobile devices 5 and 6 (as shown in FIG. 6). As a result, two mobile devices 5 and 6 can be mounted onto a handle stem of a bike together and work with each other. For example, one mobile device 5 may be a smartphone, and the other mobile device 6 may be a power bank. Thus, the smartphone can be simultaneously used and charged.

Please refer to FIG. 6. The first holding structure 2 is disposed on the first surface 10 of the mounting portion 1 and associates with the first surface 10 to form a first holding area 20 for planarly receiving a mobile device 5 on the first surface 10 in the first holding area 20. Meanwhile, the mobile device 5 is fastened by the first holding structure 2 on the first surface 10. In the shown embodiment, the first holding structure 2 is composed of loop portions 21 on corners of the first surface 10 of the mounting portion 1. Each loop portion 21 has a binding hole 210 for being inserted by a corner of the mobile device 5. As a result, the mobile device 5 can be planarly held on the first surface 10 of the mounting portion 1.

The first surface 10 may be formed with non-slip textures 100 to increase friction between the mobile device 5 and the first surface. To smoothly insert the mobile device 5 into the loop portions 21, the mounting portion 1 is provided with a plurality of extension ribs 101 at intervals and between two adjacent loop portions 21. When the mobile device 5 is being held on the mounting portion 1, the mounting portion 1 may be outward extended along a direction of the extension ribs 101 to expand the loop portions 21. It is advantageous to hold the mobile device 5.

Figure 5:
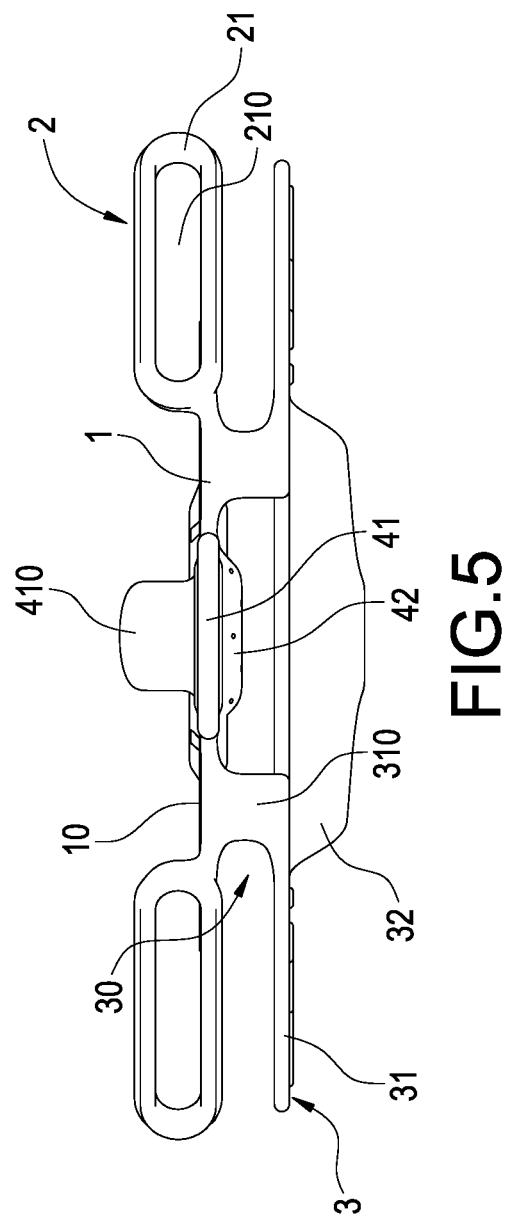
FIG. 5 is a front view of the invention.

Please refer to FIGS. 3-5. The second holding structure 3 is disposed on the second surface 11 of the mounting portion 1 and associates with the second surface 11 to form a second holding area 30 for planarly receiving another mobile device 6 on the second surface 10 in the second holding area 30 (as shown in FIG. 6). Meanwhile, the mobile device 6 is fastened by the second holding structure 3 on the second surface 11. In the shown embodiment, the second holding structure 3 is composed of a covering portions 31 and connecting ribs 310 extending from the covering portion 31 toward the mounting portion 1 so that both the covering portion 31 and the second surface 11 of the mounting portion 1 form the second holding area 31. As a result, the mobile device 6 can also be planarly held on the second surface 11 of the mounting portion 1.

Figure 8:
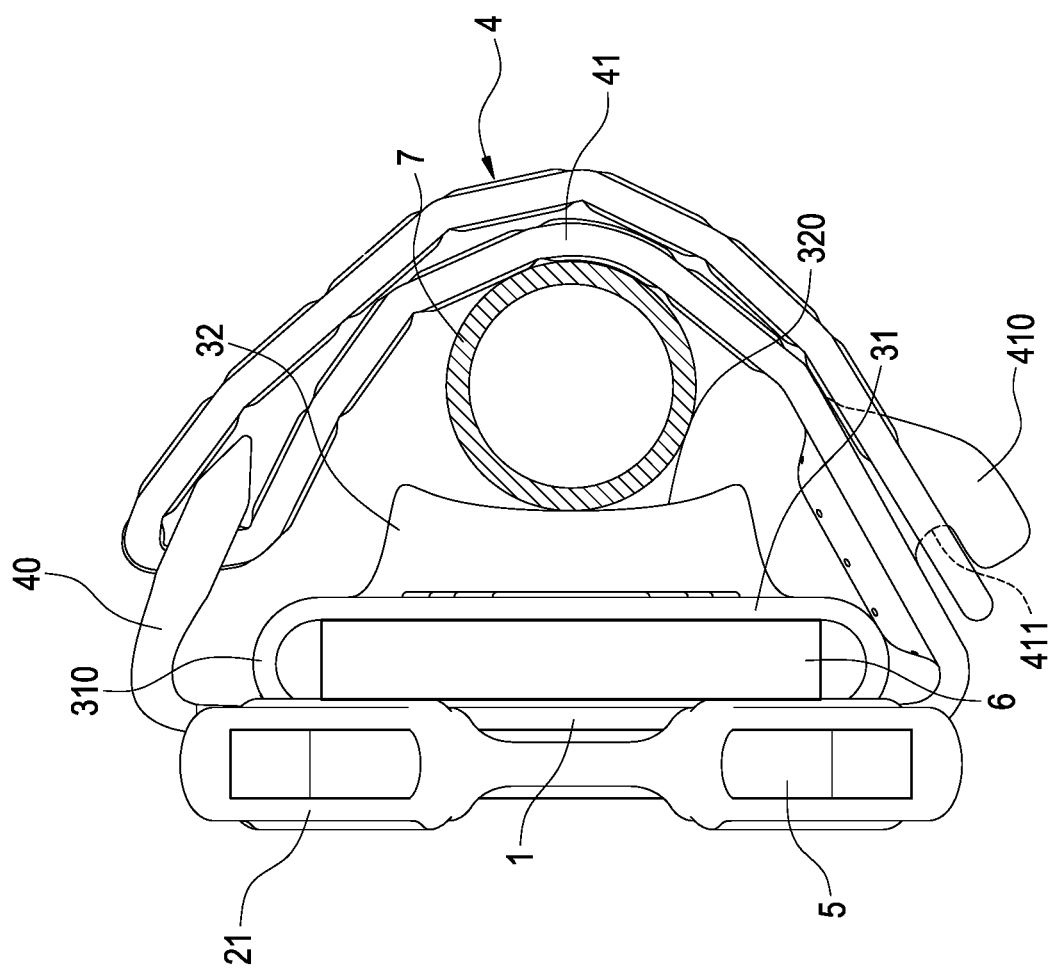
FIG. 8 is a side schematic view of the invention mounted on a rod.

Please refer to FIG. 8. The mobile device mount of the invention is usually made of rubber or silicone and integratedly formed, especially the mounting portion 1, the first holding structure 2 and the second holding structure 3. In order to avoid deformation due to being fastened on a rod 7 to cause difficulty of mounting mobile devices 5 and 6, the second holding structure 3 is provided with a protruding portion 32 for leaning against the rod 7. Also, the protruding portion 32 may prevent mobile devices 5 and 6 mounted from colliding with the rod 7. Further, the protruding portion 32 may be formed with a concave surface 320 corresponding rod 7 to be mounted to increase fixture strength.

Please refer to FIGS. 1-5. The binding structure 4 is connected to the mounting portion 1 and has a binding ring 40 and a binding belt 41. The binding ring 40 is located at a side of the mounting portion 1, and the binding belt 41 extends from another side of the mounting portion 1. In the shown embodiment, the binding structure 4 may use the same material as the mounting portion 1, the first holding structure 2 and the second holding structure 3 to be formed integratedly. In another embodiment, both the binding ring 40 and the binding belt 41 may be made by fabric and mechanically connected to the mounting portion 1.

Figure 7:
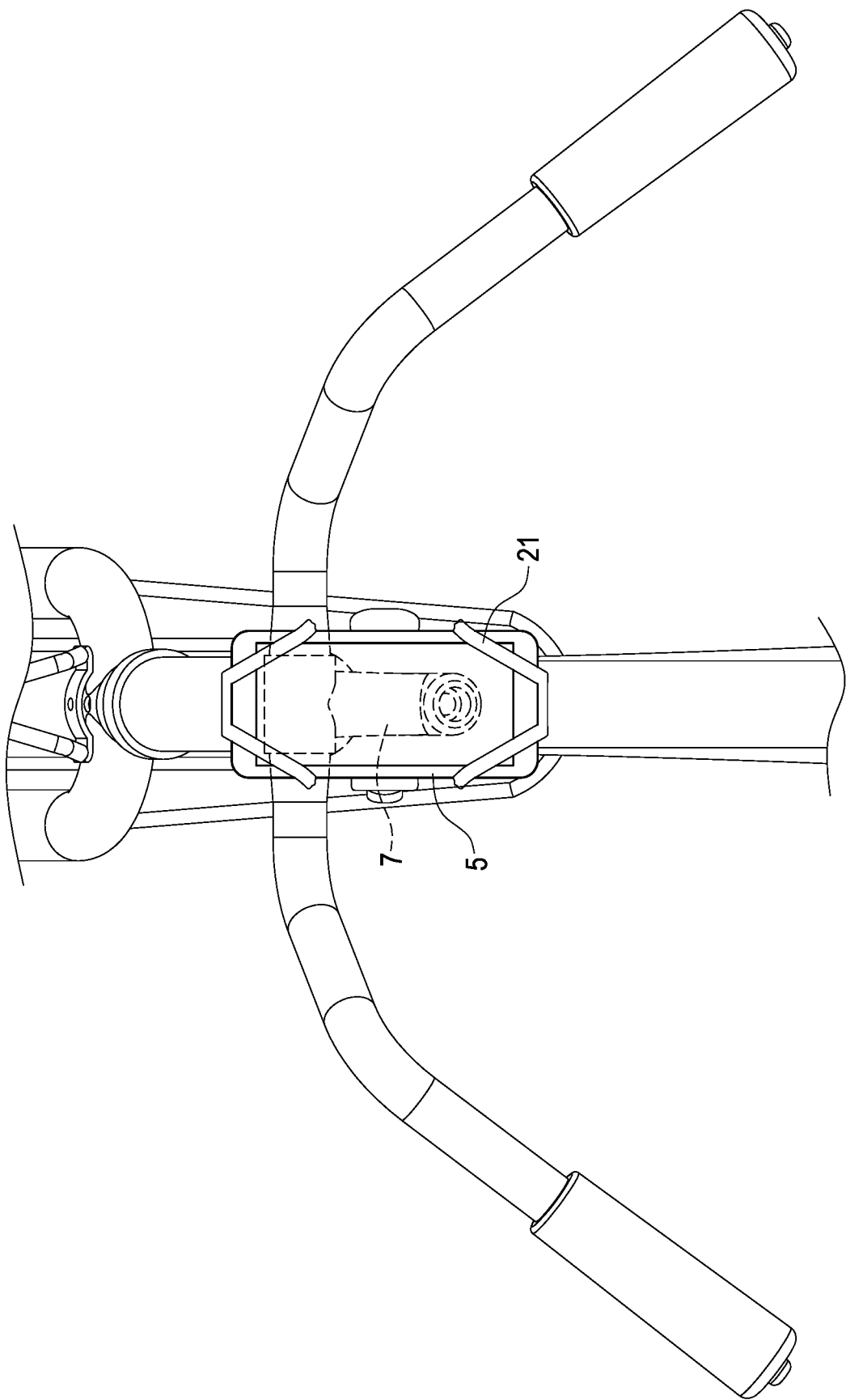
FIG. 7 is a schematic view of the invention mounted on a rod.

Thereby, as shown in FIGS. 7 and 8, the protruding portion 32 leans against the rod 7 and the binding belt 41 surrounds the rod 7 to fasten to the binding ring 40. Further, the binding ring 40 is formed with a binding slot 400 for being passed by the binding belt 41. The binding belt 41 is formed with a hook 410 near the mounting portion 1. When the binding belt 41 passes through the binding slot 400, it can be turned around to the hook 410 to make a hooking hole 411 hooked by the hook 410. Besides, the hooking hole 411 may be arranged to be longitudinally multiple in series so that one of the hooking holes 411 can be selected to be used to be hooked by the hook 410 to make adjustment.

It will be appreciated by persons skilled in the art that the above embodiment has been described by way of example only and not in any limitative sense, and that various alterations and modifications are possible without departure from the scope of the invention as defined by the appended claims.

What is claimed is:

1. A mobile device mount for vehicles, which is used for fastening on a rod (7), comprising:
  a mounting portion (1), having a first surface (10) and a second surface (11) opposite to the first surface (10);
  a first holding structure (2), disposed on the first surface (10), and associating with the first surface (10) to form a first holding area (20);
  a second holding structure (3), disposed on the second surface (11), associating with the second surface (11) to form a second holding area (30), and having a protruding portion (32) for leaning against the rod (7); and
  a binding structure (4) including a binding ring (40) and a binding belt (41), the binding belt (41) extending from one side of the mounting portion (1) and having a first side and a second side, the first side being coplanar with the first surface (10), the binding ring (40) being located at another side of the mounting portion (1);
  wherein the binding ring (40) is formed with a binding slot (400) for being passed by the binding belt (41), a hook (410) is formed on the first side of the binding belt (41) and protrudes towards the first holding structure (2), and the binding belt (41) passes through the binding slot (400) and then is turned around to make a hooking hole (411) hooked by the hook (410), thereby the protruding portion (32) leans against the rod (7), and the binding belt (41) surrounds the rod (7) to fasten to the binding ring (40).

2. The mobile device mount of claim 1, wherein the mounting portion (1) is of a sheet or plate shape.

3. The mobile device mount of claim 1, wherein the first surface (10) is formed with non-slip textures (100).

4. The mobile device mount of claim 1, wherein the first holding structure (2) comprises loop portions (21) on corners of the first surface (10), and each loop portion (21) has a binding hole (210) for being inserted by a corner of a mobile device (5).

5. The mobile device mount of claim 4, wherein the mounting portion (1) is provided with a plurality of extension ribs (101) at intervals and between adjacent two of the loop portions (21).

6. The mobile device mount of claim 1, wherein the second holding structure (3) has a covering portion (31) and connecting ribs (310) extending from the covering portion (31) toward the mounting portion (1) so that both the covering portion (31) and the second surface (11) form the second holding area (30) for holding a mobile device (6).

7. The mobile device mount of claim 1, wherein the protruding portion (32) is formed with a concave surface (320) corresponding to the rod (7).

8. The mobile device mount of claim 1, wherein the mounting portion (1), the first holding structure (2) and the second holding structure (3) are formed integratedly.

9. The mobile device mount of claim 8, wherein the binding structure (4), the mounting portion (1), the first holding structure (2) and the second holding structure (3) are formed integratedly.

* * * * *